(12) United States Patent
Saers et al.

(10) Patent No.: US 11,661,071 B2
(45) Date of Patent: May 30, 2023

(54) METHOD AND CONTROL UNIT FOR UPDATING AT LEAST ONE FUNCTIONALITY OF A VEHICLE

(71) Applicant: Scania CV AB, Södertälje (SE)

(72) Inventors: Alexander Saers, Hägersten (SE); Johan Aneros, Huddinge (SE); Henrik Felixson, Stockholm (SE)

(73) Assignee: Scania CV AB, Södertälje (SE)

( * ) Notice: Subject to any disclaimer, the term of this patent is extended or adjusted under 35 U.S.C. 154(b) by 342 days.

(21) Appl. No.: 16/957,557

(22) PCT Filed: Dec. 11, 2018

(86) PCT No.: PCT/SE2018/051277
§ 371 (c)(1),
(2) Date: Jun. 24, 2020

(87) PCT Pub. No.: WO2019/132751
PCT Pub. Date: Jul. 4, 2019

(65) Prior Publication Data
US 2020/0324782 A1 Oct. 15, 2020

(30) Foreign Application Priority Data
Dec. 27, 2017 (SE) .................................... 1751654-3

(51) Int. Cl.
*B60W 40/12* (2012.01)
*G06F 8/65* (2018.01)
(Continued)

(52) U.S. Cl.
CPC .............. *B60W 40/12* (2013.01); *G06F 8/65* (2013.01); *G06F 9/44526* (2013.01); *G07C 5/008* (2013.01); *B60W 2556/45* (2020.02)

(58) Field of Classification Search
CPC ..... B60W 40/12; B60W 2556/45; G06F 8/65; G06F 9/44526; G06F 9/541; G06F 9/451;
(Continued)

(56) References Cited

U.S. PATENT DOCUMENTS 8,606,838 B1 12/2013 Kenefic et al.
8,880,654 B2 11/2014 Zachos
(Continued)

FOREIGN PATENT DOCUMENTS

CN 203520300 U 4/2014
CN 103782578 A 5/2014
(Continued)

OTHER PUBLICATIONS

Buga, Walter J., "Automotive OTA: The potential and the challenge," Automotive Linux Summit, May 28, 2013, pp. 1-18, https://events.static.linuxfound.org/sites/events/files/alss13_buga.pdf.
(Continued)

*Primary Examiner* — Rodney A Butler
(74) *Attorney, Agent, or Firm* — Moore & Van Allen PLLC; W. Kevin Ransom

(57) ABSTRACT

A method and control system for updating functionality of a vehicle are presented. The vehicle includes at least one vehicle internal system, at least one add-on system arranged in the vehicle after the vehicle is produced by a manufacturer, and at least one internal communication unit arranged for communication with at least one vehicle external communication unit. The method includes: receiving, using the at least one internal communication unit, information related to at least one functionality of the vehicle from the at least one vehicle external communication unit; and updating, based on the information related to at least one functionality of the vehicle, at least one functionality defined in an add-on interface, the add-on interface being arranged in the vehicle
(Continued)

as an interface between the at least one vehicle internal system and the at least one add-on system, whereby updating of said at least one functionality is parameter-based.

15 Claims, 5 Drawing Sheets

(51) Int. Cl.
G06F 9/44 (2018.01)
G07C 5/00 (2006.01)
G06F 9/445 (2018.01)

(58) Field of Classification Search
CPC ....... G06F 13/38; G06F 13/382; G07C 5/008; H04L 67/34; H04L 67/12; H04L 65/40; B60L 2270/40; B60Y 2304/076
See application file for complete search history.

(56) References Cited

U.S. PATENT DOCUMENTS

| | | | |
|---|---|---|---|
| 10,284,652 B2 | 5/2019 | Douthitt et al. | |
| 2002/0116116 A1 | 8/2002 | Mathew et al. | |
| 2008/0065994 A1 | 3/2008 | Wang et al. | |
| 2008/0247576 A1 | 10/2008 | Marlowe | |
| 2010/0037215 A1 | 2/2010 | Meiss et al. | |
| 2010/0217899 A1 | 8/2010 | Sitzmann et al. | |
| 2011/0046788 A1 | 2/2011 | Daly et al. | |
| 2011/0276219 A1 | 11/2011 | Swaminathan et al. | |
| 2011/0313647 A1 | 12/2011 | Koebler et al. | |
| 2013/0173751 A1 | 7/2013 | Zachos | |
| 2013/0282925 A1 | 10/2013 | Cawse et al. | |
| 2013/0289797 A1 | 10/2013 | Johnson et al. | |
| 2013/0332844 A1 | 12/2013 | Rutledge | |
| 2014/0121895 A1 | 5/2014 | Yeh | |
| 2014/0343753 A1* | 11/2014 | Kirsch | G07C 5/0816 701/2 |
| 2015/0039206 A1 | 2/2015 | Storch et al. | |
| 2016/0031388 A1 | 2/2016 | Grimm et al. | |
| 2016/0185221 A1 | 6/2016 | Mere et al. | |
| 2016/0197782 A1 | 7/2016 | Hort et al. | |
| 2017/0082056 A1 | 3/2017 | Stanek et al. | |
| 2017/0132016 A1* | 5/2017 | Zilberman | G06F 3/165 |
| 2017/0212525 A1 | 7/2017 | Wang et al. | |
| 2017/0242688 A1 | 8/2017 | Yu et al. | |

FOREIGN PATENT DOCUMENTS

| | | |
|---|---|---|
| CN | 103814588 A | 5/2014 |
| CN | 205930548 U | 2/2017 |
| CN | 107211005 A | 9/2017 |
| WO | 2013039760 A1 | 3/2013 |
| WO | 2015065811 A1 | 5/2015 |

OTHER PUBLICATIONS

Scania CV AB, European Patent Application No. 18894453.2, Extended European Search Report, dated Aug. 27, 2021.
Scania CV AB, Korean Patent Application No. 10-2020-7020590, Office Action, dated Jul. 28, 2021.
Scania CV AB, International Application No. PCT/SE2018/051277, International Search Report, dated Jun. 3, 2019.
Scania CV AB, International Application No. PCT/SE2018/051277, Written Opinion, dated Jun. 3, 2019.
Scania CV AB, Swedish Application No. 1751654-3, Office Action, dated Aug. 28, 2018.
Scania CV ABb, Swedish Application No. 1751654-3, Office Action, dated Mar. 7, 2019.
Scania CV AB, Swedish Application No. 1751654-3, Office Action, dated Sep. 4, 2019.
Scania CV AB, International Application No. PCT/SE2018/051277, International Preliminary Report on Patentability, dated Jun. 30, 2020.
Scania CV AB, Chinese Patent Application No. 201880082841.8, First Office Action, dated Aug. 9, 2022.
Scania CV AB, Swedish Patent Application No. 1751654-3, Office Action, dated Sep. 29, 2022.

* cited by examiner

METHOD AND CONTROL UNIT FOR UPDATING AT LEAST ONE FUNCTIONALITY OF A VEHICLE

CROSS-REFERENCE TO RELATED APPLICATIONS

This application is a national stage application (filed under 35 § U.S.C. 371) of PCT/SE2018/051277, filed Dec. 11, 2018 of the same title, which, in turn, claims priority to Swedish Application No 1751654-3 filed Dec. 27, 2017; the contents of each of which are hereby incorporated by reference.

FIELD OF THE INVENTION

The present invention relates to a method for updating at least one functionality of a vehicle. The present invention also relates to a control unit arranged for updating at least one functionality of a vehicle. The present invention also relates to a computer program and a computer-readable medium comprising instructions for carrying out the method according to the invention.

BACKGROUND OF THE INVENTION

The following background information is a description of the background of the present invention, which thus not necessarily has to be a description of prior art.

Vehicle manufacture may be conducted in a variety of ways. In for example the car industry, the manufacturer usually produces vehicles that are complete and intended for direct delivery to final customers.

The heavy vehicle industry, however, commonly also employs other kinds of production methods. Manufacturers of heavy vehicles may, as in the car industry, produce vehicles intended for delivery directly to final customers or final users of the vehicles. However, it is also common that heavy vehicles produced by the manufacturer are only partly manufactured, i.e. are only completed to a certain extent, including vehicle internal systems, in view of being subsequently completed by another part than the manufacturer, for example a user or a customer of the manufacturer, e.g. a third-party supplier, in such a way as to meet specific requirements of the final customers or users.

It may also be that the vehicle, although substantially completed by its manufacturer, will be provided with further functionalities and/or systems, in this document denoted add-on systems, e.g. by another party such as a third-party supplier, a customer, or a final user, before it is put into use. It is for example usual that commercial vehicle manufacturers, as well as producing fully equipped vehicles, produce also vehicle versions being only partly manufactured, for example intentionally comprising only the chassis, or the chassis and the driver compartment/cab. The partially manufactured vehicle is then intended to be subsequently completed with one or more additional systems and/or functionalities by another party than the manufacturer, in accordance with the specific requirements of the another party, being e.g. a final customer and/or final user.

For example, chassis produced by a vehicle manufacturer may be designed to be usable in any desired way as bases for building on in order to construct mobile homes, fire vehicles, ambulances, concrete mixer trucks, refrigerated vehicles, or any other especially adapted vehicle. Also, for example a bus chassis may be produced by the vehicle manufacturer with little or no bodywork, with the intention to complete the vehicle with subsequent building-on performed by a bus bodybuilder. Generally, a bodybuilder installs/adds one or more add-on systems, i.e. does bodywork, on a vehicle after its original manufacture.

Thus, the building-on and/or addition of one or more systems and/or functionalities carried out by another party may be very extensive, and at least some building-on is also very common in the case of heavy vehicles. For this reason, the vehicle manufacturer often also prepares the vehicle in such a way as to facilitate subsequent building-on.

For example, one or more power takeoffs are often included in the vehicle by the manufacturer, e.g. so that add-on systems may be connected for example to the vehicle's engine and/or gearbox to enable them to be provided with driving power from the vehicle. There may also be connections to make it possible to use, for example, the vehicle's electrical system, hydraulic system and/or pneumatic system for implementation of add-on functions. A vehicle may thus be provided with a plurality of power takeoffs, and the power takeoff requirement may vary depending on the kinds of applications built onto the vehicle. Certain applications may for example require power which is constantly available when the engine of the vehicle is running, irrespective of whether the vehicle is moving or not, e.g. in the case of concrete mixer trucks, refrigeration units in refrigerated vehicles. Other applications may only need power on distinct occasions, e.g. upon activation of an additional system. The activation of a power takeoff for, and hence activation of the operation of, one or more built-on systems and/or functionalities is often not such that continuous or unregulated power takeoff is desirable, since it is only usually required in certain situations, e.g. upon a demand from the built-on systems and/or functionalities themselves or from, for example, the vehicle's driver.

SUMMARY OF THE INVENTION

The one or more add-on systems being implemented in the vehicle are often unknown for the vehicle internal systems, i.e. for the internal systems being provided by the manufacturer. Thus, the one or more add-on systems may be unknown for the manufacturer of the vehicle, and also for an add-on interface of the vehicle. Generally, the manufacturer cannot, already when the vehicle is produced, know which add-on systems that will be added to the vehicle later on, and the vehicle can obviously therefore also not possibly be equipped at manufacture to interact with such unknown add-on systems.

Thus, it may be impossible to perform actions, functions and/or operations in the vehicle based e.g. on signals provided by the add-on systems, since the signals cannot even be interpreted by the vehicle internal systems and/or the add-on interface. Hereby, there is a risk that important actions, functions and/or operations are not properly performed in the vehicle.

It is therefore an object to solve at least some of the above-mentioned disadvantages.

The object is achieved by a method for updating at least one functionality of a vehicle, the vehicle including:
- at least one vehicle internal system;
- at least one add-on system, the add-on system being arranged in the vehicle after the vehicle is produced by a manufacturer; and
- at least one internal communication unit arranged for communication with at least one vehicle external communication unit.

The method includes:
receiving, by usage of the at least one internal communication unit, information related to at least one functionality of the vehicle from the at least one vehicle external communication unit;
updating, based on the information related to at least one functionality of the vehicle, at least one functionality defined in an add-on interface, the add-on interface being arranged in the vehicle as an interface between the at least one vehicle internal system and the at least one add-on system, wherein
said information related to said at least one functionality includes one or more vehicle related parameters; and
said updating of said at least one functionality is parameter-based and includes utilizing said one or more vehicle related parameters for said at least one functionality defined in said add-on interface, whereby the functionality of the add-on interface is adaptable or adjustable by usage of parameter adaption or adjustment without a compilation of programming code and without an update of the programming code Hereby, the functionality of the add-on interface may, based on information provided e.g. by a final user and/or a customer, be adapted such that it matches essentially any possible add-on system that is implemented in the vehicle. The functionality of the add-on interface may here be adapted/adjusted by the final user and/or a customer, which may have better knowledge of the added add-on systems. The adaption may be performed by transmitting configuration information related to the functionality to the vehicle. The functionality information is transmitted by use of the at least one internal and the at least one external communication unit.

Since the functionality of the add-on interface is hereby easily, reliably and remotely adapted to match the at least one add-on system, a flexible add-on interface is provided, which by the final user and/or customer easily may be adapted/adjusted/configured to match the at least one add-on system being implemented in the vehicle. The adaption/adjustment/configuration may completely be controlled by another part than the manufacturer, such as a final user and/or a customer, that normally have better knowledge about some of the add-on systems than the original manufacturer has.

According to the present invention,
the information related to the at least one functionality includes one or more vehicle related parameters; whereby
the updating of the at least one functionality is parameter-based and includes utilizing the one or more vehicle related parameters for the at least one functionality defined in the add-on interface.

The functionality of the add-on interface may here be adapted/adjusted by usage of parameter adaption/adjustment, which does not demand a compilation of programming code and/or update of the actual programming code. Thus, the manufacturer of the vehicle does not have to be involved in the update of the add-on interface, which dramatically reduces the cost and time, possibly including vehicle off road time, that conventionally has been needed for performing such updates. In other words, a distributed update without need for compilation is hereby provided. Instead, the final user and/or a customer, which may have better knowledge of the added add-on systems, can adapt the configuration of the add-on interface by sending functionality information to the vehicle. The functionality information is transmitted by use of the at least one internal and the at least one external communication unit, as mentioned above.

Hereby, essentially any off-the-shelf products may be implemented as an add-on system in the vehicle, without having to perform a software update. Instead, the final user and/or customer may itself easily and reliably update/adjust the add-on interface, without involvement of the manufacturer.

A fast and accurate update of the add-on interface program, and thereby also an update of the functionality of the vehicle, is provided. If e.g. a customer has a fleet of several vehicles, the add-on interfaces of the entire fleet may be easily and remotely adapted when this embodiment is used.

By way of embodiments of the present invention, the addition of an add-on system to the vehicle is facilitated.

According to an embodiment of the present invention, the one or more vehicle related parameters are related to one or more of:
the vehicle itself;
a road section travelled by the vehicle; and
ambient conditions surrounding the vehicle.

Since the update/adjustment of the add-on interface may be performed based on various vehicle related parameters, a very flexible control of the add-on interface is achieved.

According to an embodiment of the present invention,
the information related to the at least one functionality includes information related to the add-on interface itself; whereby
the updating of the at least one functionality includes altering the add-on interface.

Hereby, an over-the air, i.e. a remotely controlled, update/altering of the add-on interface, i.e. of the add-on interface program, is easily achieved. A fast and accurate update of the add-on interface program, and thereby also an update of the functionality of the vehicle, is provided. If e.g. a customer has a fleet of several vehicles, the add-on interfaces of the entire fleet may be easily and remotely adapted when this embodiment is used.

The final user and/or a customer, which may have better knowledge of the added add-on systems, can adapt the configuration of the add-on interface by sending functionality information to the vehicle. Hereby, essentially any off-the-shelf products may be implemented as an add-on system in the vehicle.

According to an embodiment of the present invention,
the information related to the add-on interface itself includes software update information for the add-on interface; whereby
the updating of the at least one functionality includes an update of at least a part of a programming code defining the add-on interface.

Hereby, the final user and/or a customer, which may have better knowledge of the added add-on systems, can remotely and easily adapt the actual programming code defining the add-on interface, by sending software update information to the vehicle.

According to an embodiment of the present invention, the updating of the at least one functionality defined in the add-on interface includes one or more of:
an update of at least one functionality related to the at least one vehicle internal system; and
an update of at least one functionality related to the at least one add-on system.

Hereby, functionalities related to both the vehicle internal systems, being installed already by the manufacturer at production of the vehicle, and the add-on systems may be defined and configured in the add-on interface, such that the add-on interface is matched to all of these systems. All of these systems may then interact and work together.

According to an embodiment of the present invention, the information related to at least functionality of the vehicle is received from one or more of:
- a final user of the vehicle;
- at least one other part than the manufacturer, the at least one other part having knowledge of, e.g. by providing, the at least one add-on system; and
- the manufacturer.

Thus, the functionality of the add-on interface may be flexibly updated/configured based on information provided by a number of sources. Essentially anyone with knowledge of the add-on systems may be able to update the add-on interface, wherefore the vehicle does not have to go to the workshop for the update/configuration. The vehicle off road time and the update costs are hereby greatly reduced.

The object is also achieved by the above-mentioned control unit arranged for updating at least one functionality of a vehicle, the vehicle including:
- at least one vehicle internal system;
- at least one add-on system, the add-on system being arranged in the vehicle after the vehicle is produced by a manufacturer; and
- at least one internal communication unit arranged for communication with at least one vehicle external communication unit.

The control unit is arranged for:
- receiving, by usage of the at least one internal communication unit, information related to at least one functionality of the vehicle from the at least one vehicle external communication unit;
- updating, based on the information related to at least one functionality of the vehicle, at least one functionality defined in an add-on interface, the add-on interface being arranged in the vehicle as an interface between the at least one vehicle internal system and the at least one add-on system, wherein
- said information related to said at least one functionality includes one or more vehicle related parameters; and
- said updating of said at least one functionality is parameter-based and includes utilizing said one or more vehicle related parameters for said at least one functionality defined in said add-on interface, whereby the functionality of the add-on interface is adaptable or adjustable by usage of parameter adaption or adjustment without a compilation of programming code and without an update of the programming code.

The control unit has advantages corresponding to the ones mentioned above for the method.

The object is also achieved by the above-mentioned computer program and computer-readable medium.

Detailed exemplary embodiments and advantages of the method, control system, computer program and computer-readable medium according to the invention will below be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF THE INVENTION

Figure 1:
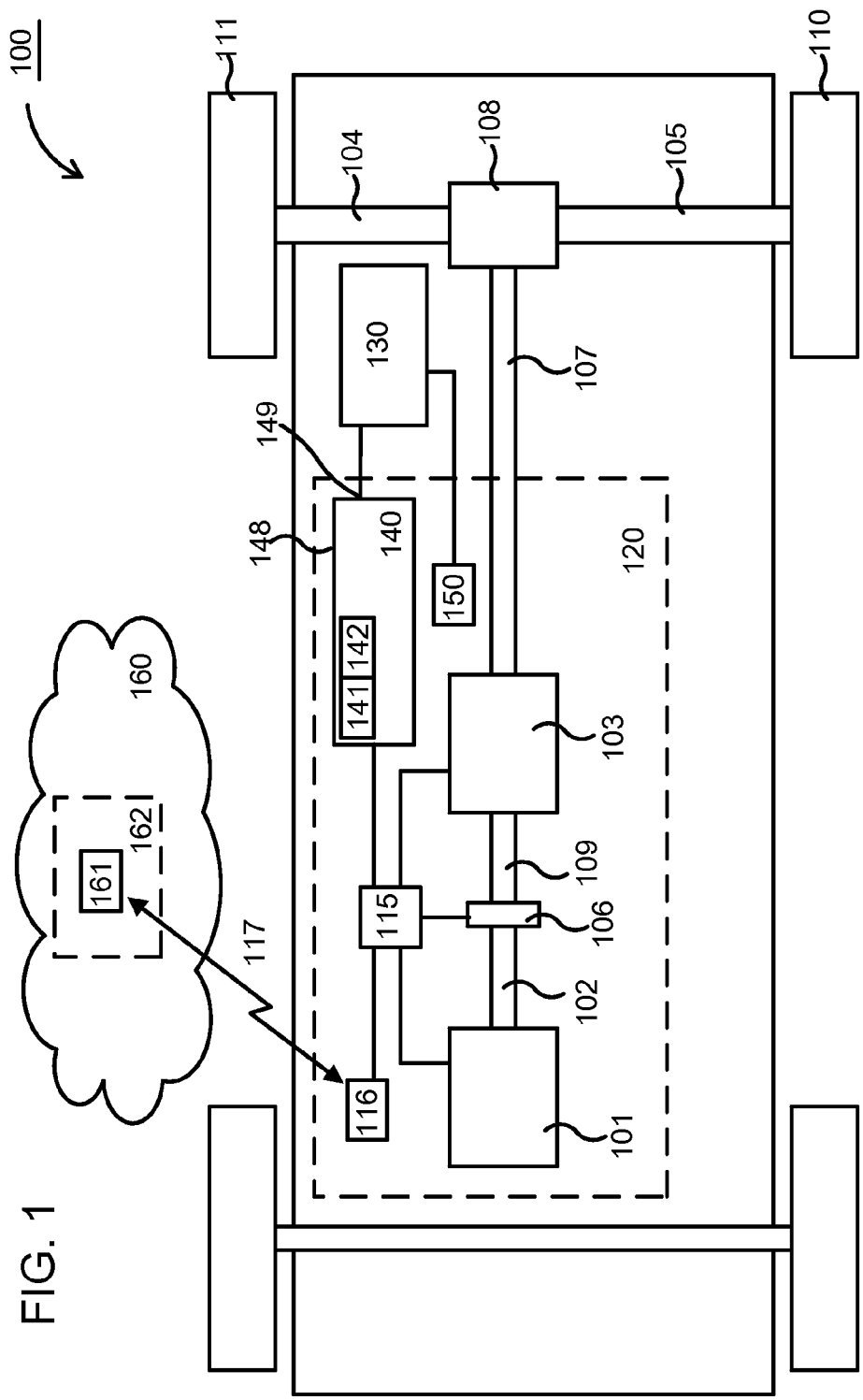
FIG. 1 is a schematic illustration of a non-limiting example of a vehicle in which the embodiments of the present invention may be implemented.

FIG. 1 schematically illustrates a power train in a vehicle 100, in which the embodiments of the present invention may be implemented. The illustrated vehicle 100 has only one axle 104, 105 with tractive/drive wheels 110, 111, but the invention is also applicable to vehicles which have more than one axle provided with tractive wheels. The power train comprises a combustion engine 101 which in a conventional way, via an output shaft 102 of the engine, usually via a flywheel, is connected to a gearbox 103 via a clutch 106 and an input shaft 109 connected to the gearbox 103.

The engine may be controlled by the vehicle's control system via a control unit 115. The clutch 106, which may for example take the form of an automatically controlled clutch, and/or the gearbox 103, which may for example be a conventional automatic gearbox, may also be controlled by means of one or more suitable control units, generally depicted as the control unit 115 in FIG. 1. Thus, the function of the control unit 115 may be provided by two or more control units, as is mentioned more in detail below.

The vehicle 100 may further include at least one internal communication unit 116, being associated/connected to one or more control units 115 of the vehicle. For example, the at least one internal communication unit 116 may be included in a control system network of the vehicle 100. The control system network may, as is described below, essentially include any suitable communication interface facilitating communication between control units/devices/entities in the vehicle 100. For example, the communication interface connects the one or more vehicle internal systems 120 with each other, including connecting the at least one internal communication unit 116 with the control unit 115 and other internal systems 120 of the vehicle 100. Such a communication interface many for example, include a controller area network (CAN), an Ethernet connection, a Flexray bus, a local interconnect network (LIN) bus and/or a WiFi connection.

The at least one internal communication unit 116 is arranged for communication with at least one vehicle external communication unit 161, i.e. arranged for transmitting information to and/or receiving information from the at least one vehicle external communication unit 161. The at least one vehicle external communication unit 161 is arranged outside of the vehicle 100, and may be included in and/or associated/connected to essentially any suitable external device/node/apparatus/entity 162, such as e.g. at least one web and/or internet related unit, at least one internet cloud 160 related unit, at least one infrastructure unit, at least one external communication entity included in at least one other vehicle, at least one server and/or at least one database. The at least one vehicle external communication unit 161 may also be included in and/or associated/connected to essentially one or more of the units/devices/entities 411, 412, 413, 414, 420, 430, 440 of an add-on/bodybuilder network 410, as is described more in detail below.

The communication between the at least one internal 116 and at least one external 161 communication units may be performed by usage of a wireless connection 117, e.g. a connection working according to essentially any suitable wireless standard, specification and/or protocol, such as according to the Global System for Mobile communications (GSM) standard, the General Packet Radio Service (GPRS) standard, the Bluetooth standard, any suitable wireless local area networking (WiFi) standard, any suitable generation of a broadband cellular technology (3G, LTE, 4G, 5G) standard, and/or any other suitable wireless standard. Alternatively, the connection 117 may also be a wired connection, including usage of at least one cable or other wiring equipment.

As illustrated in FIG. 1, an output shaft 107 from the gearbox 103 drives the tractive wheels 110, 111 via a final gear 108, e.g. a conventional differential, and driveshafts 104, 105 which are connected to the final gear.

The engine 101, the clutch 106 and the gearbox 103 may be examples of vehicle internal systems 120. As is understood by a skilled person, the vehicle may include a large number of such vehicle internal systems 120, i.e. systems arranged in the vehicle 100 when it was produced by the manufacturer.

In this document, parts, systems and/or functionalities being included/arranged in the vehicle already at vehicle manufacture/production by the manufacturer is commonly denoted vehicle internal system 120. Correspondingly, parts, systems and/or functionalities being included/arranged in the vehicle after the manufacture/production by the manufacturer is commonly denoted add-on systems 130 in this document. The manufacturer is in this document defined as a producer of the original/initial vehicle, being partly completed with at least one vehicle internal system 120 but lacking the later added at least one add-on system 130. The manufacturer of the partly completed vehicle may also be denoted as original equipment manufacturer (OEM). The one or more add-on systems 130 may be provided by another party, which in this document means a party which may be another and/or independent of the vehicle manufacturer, and to which a vehicle produced by the vehicle manufacturer is directly or indirectly delivered after being manufactured/produced. Thus, the other party may be a customer or a final user, but may also be a third-party supplier, which carries out building-on, i.e. addition of one or more add-on systems 130, before delivery to a final customer.

It should be noted that the vehicle depicted in FIG. 1 is merely one example of how the vehicle might be configured, as the embodiments of the invention are applicable to all types of vehicles, e.g. those with hybrid power trains, electric vehicles and/or other kinds of axle configurations, other types of gearboxes with or without clutches etc.

The one or more add-on systems 130 illustrated in FIG. 1 may be provided with power from one or more takeoffs 150, which may be situated at various locations in the vehicle 100.

The one or more add-on systems 130 may be of various kinds, e.g. one might comprise activation of a crane function via a power takeoff, whereas another might comprise illumination of a certain warning lamp at the vehicle driver's location. Thus, the one or more add-on systems 130 may be of a simple kind, i.e. have a low complexity, but may also have substantially any desired functionality, and thus also any complexity.

The one or more add-on systems 130 may need, i.e. may have a demand for, power to be provided to the add-on systems 130. The one or more add-on systems 130 may also need, i.e. may have a demand for, being able to communicate with an internal control system of the vehicle, in order to be provided with one or more signals, parameters and/or control signals available in the internal control system, and/or to be able to provide one or more signals, parameters and/or control signals to the one or more vehicle internal systems 120 via the vehicle internal control system. The one or more add-on systems 130 may also need, i.e. may have a demand for, being able to communicate with one or more nodes/devices/entities/equipment external from the vehicle.

Power needed by the one or more add-on systems 130 may e.g. be provided by the above mentioned one or more power takeoffs 150 and/or may be provided by an add-on interface 140 arranged for providing communication between the one or more vehicle internal systems 120 and the one or more add-on systems 130. The communication between the one or more vehicle internal systems 120 and the one or more add-on systems 130 is facilitated by the add-on interface 140. Thus, the add-on interface communicates one or more signals, parameters and/or control signals between the one or more vehicle internal systems 120 and the one or more add-on systems 130. Thus, the add-on interface 140 is provided as a general interface between the at least one vehicle internal system 120 and said at least one add-on system 130. The add-on interface includes one or more inputs/outputs, for example input/output pins, to which systems, such as e.g. add-on systems, may be connected. Via these inputs/outputs, signals are received/transmitted to the systems connected to the add-on interface 140. For example, the one or more add-on systems may be connected to one or more inputs of the add-on interface, and may provide signals of any suitable signaling format, which is often related to the specific add-on system providing the signal, to the one or more inputs. Essentially, any signaling format mentioned in this document may be received at the one or more inputs. Correspondingly, signals may also be output on the one or more outputs of the add-on interface 140, on a suitable signaling format, such as any signaling format mentioned in this document.

As mentioned above, the at least one internal communication unit 116, and also the vehicle internal system 120, may be included in a control system network of the vehicle 100, which may include the above-mentioned communication interface connecting the one or more vehicle internal systems 120 with each other. Such a communication interface may for example, include a controller area network (CAN), an Ethernet connection, a Flexray bus, a local interconnect network (LIN) bus and/or a WiFi connection. Such a communication interface may be generally used for connecting units/devices/entities/interfaces in the vehicle 100, such as connecting the add-on systems 130 to the add-on interface 140. The at least one add-on system 130 may be connected to an external control system network input, e.g. an external controller area network (CAN) input 149, of an interface/control unit 148 including the add-on interface 140. Hereby, a connection between the one or more add-on systems 130 and the communication interface, such as e.g. the controller area network (CAN), is provided, which is used for connecting the one or more add-on systems 130 to the one or more vehicle internal systems 120, via the communication interface, e.g. via the controller area network (CAN).

Thus, the one or more add-on systems 130 may need various information to be provided to them, from within the vehicle and/or from outside of the vehicle, and may therefore have a demand for communication abilities. The one or more add-on systems 130 may also demand resources from the vehicle, such as e.g. status signals from the vehicle, i.e. the signal state of appropriate outputs of the interface/control unit 148 including/implementing the add-on interface 140. The resources which the one or more add-on systems demand for their functions may for example take the form of a demand for mechanical power, electric power, hydraulic power and/or pneumatic power, and/or may take the form of a demand for at least one signal and/or at least one function of the control system of the vehicle. Normally, a demanded power, requiring activation of a power takeoff 150 has to be demanded from the internal control system of the vehicle 100. Where resources are demanded, they are often not constantly demanded, and are also often not constantly available.

Vehicle manufacturers are reluctant for some other party, e.g. a third-party supplier, to effect changes directly in the internal control system of the vehicle, since this may affect the performance of the vehicle in ways which are both undesirable and difficult to predict. This is also why the vehicle manufacturer provides the add-on interface 140, i.e. a signaling interface which can be used for an add-on system for communication with the internal control system of the vehicle.

The add-on interface 140 may be of various kinds, and may include a number of inputs and outputs, which each may have a certain function assigned to it. One output might for example represent activation of a vehicle internal system 120, e.g. a parking brake activation, and when the parking brake is applied this output might for example be set to a high level, in order thereby to communicate the activation of the internal system, e.g. the parking brake, to the one or more add-on systems 130. As is understood by a skilled person, a large number of other examples of functions, whose status may be signaled in a similar way, may be provided by the add-on interface 140. These signals may then be used by the one or more add-on systems 130, but subject for example to various conditions, which usually have to be fulfilled for a certain function to be activated.

Thus, by the add-on interface 140, the vehicle manufacturer may provide a building-on interface to enable communication between the internal systems 120 and the add-on system 130. The add-on interface 140 may for example comprise one or more terminal blocks having a number of inputs/outputs, such that high/low/numerical signals on an output may for example represent a status of a certain function, and this information may be used as a control signal for conditional control of add-on system functions. There may also be inputs, e.g. for conveying from the add-on systems 130 signaling, e.g. such that inputting a high signal level on a certain input indicates a demand for activation of a function having a defined meaning.

As a given chassis configuration may be used for add-on systems within a large number of areas of application, it is often not possible at vehicle manufacturing stage to know the specific intended use of a specific chassis, still less the characteristics of specific add-on systems 130. Thus, the add-on systems may communicate their status, e.g. whether the function is active or inactive, by applying e.g. a voltage to an input on the add-on interface 140, which will be communicated further to the internal control system and/or vehicle internal systems 120 by the add-on interface 140. The internal communication system and/or the vehicle internal systems 120 will thus also be aware that add-on systems 130 exist and their status.

Control systems in modern vehicles usually comprise a communication bus system comprising of one or more communication buses arranged for connecting together a number of electronic control units (ECUs), e.g. the control units, or controllers, and various systems/components/devices on board the vehicle. Such a control system may comprise a large number of control units and the responsibility for a specific function may be spread over more than one of them.

For sake of simplicity, FIG. 1 shows only some such control units 115, 140. However, parts of the present invention may be implemented in any suitable control unit, e.g. the control units 115, 140, or wholly or partly in one or more other control units on board the vehicle 100. Control units of the kind depicted are normally adapted to receiving sensor signals from various parts and/or control units of the vehicle. Control units are also usually adapted for delivering control signals to various parts and components of the vehicle, e.g. the control units 115, 140 may deliver signals to suitable actuators for activation of power takeoffs and/or for activation of other vehicle internal systems 120.

The control unit 115 is in FIG. 1 schematically illustrated as receiving signals and/or providing control signals from and/or to the engine 101, the clutch 106 and/or the gearbox 103. The control unit 115 may, also receive and/or provide control signals to and/or from other internal systems/devices 120 in the vehicle 100.

According to some embodiments of the present invention, as described in this document, the add-on interface 140 may comprise reception means 141 arranged for receiving functionality related information, e.g. a reception unit 141, updating means 142 arranged for updating at least one functionality of the vehicle, e.g. an updating unit 142. These control means/units/devices 141, 142 are described more in detail below, and may be divided physically into more entities than the herein described interface control unit 148, or may be arranged in less entities than herein described, e.g. in one control unit.

Figure 2:
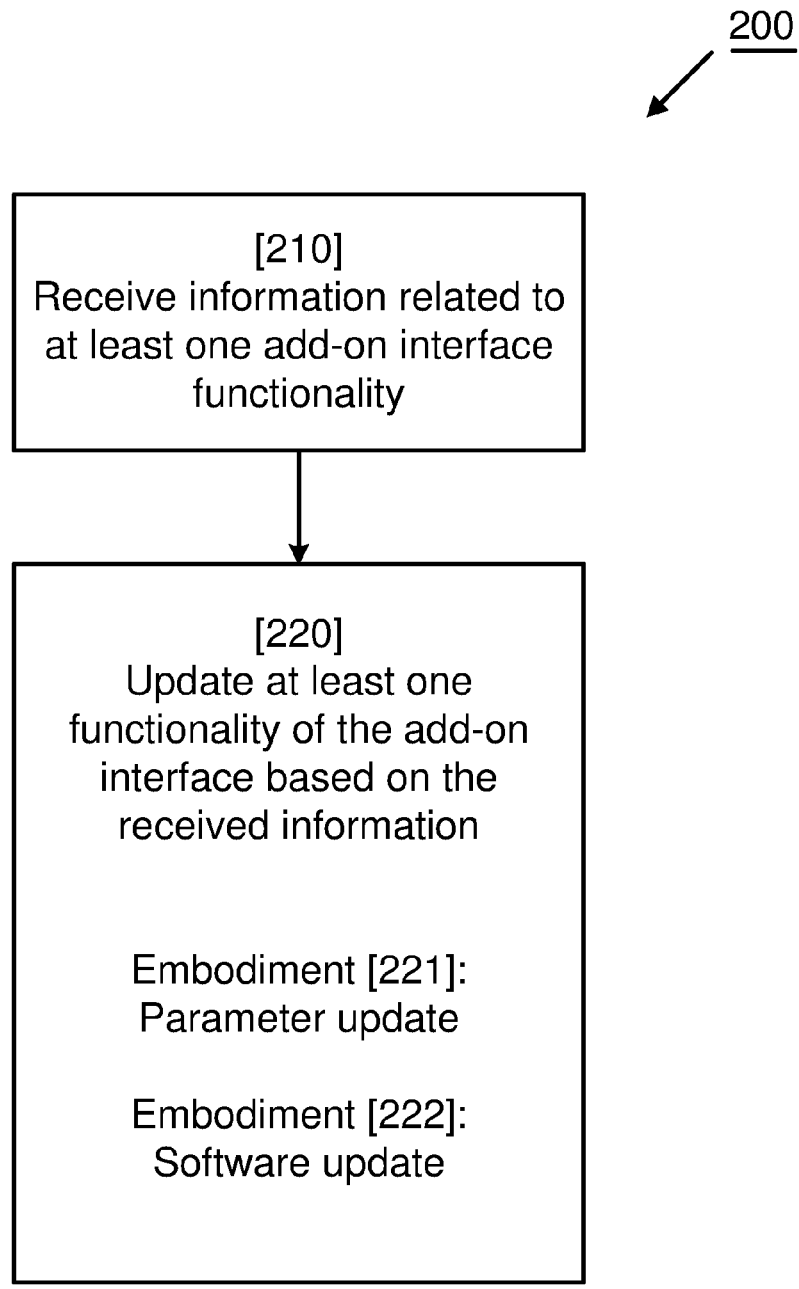
FIG. 2 shows a flow chart diagram for some embodiments of the present invention, FIG. 3 schematically illustrates a control unit, FIG. 4 schematically illustrates a non-limiting example of a system, in which embodiments of the present invention may be implemented.

FIG. 2 shows a flow chart diagram for a method 200 according to an embodiment of the present invention, i.e. a method for updating at least one functionality of a vehicle. The method steps of FIG. 2 may be performed in another order than illustrated in FIG. 2, as long as the information needed for performing a method step is available when the step is to be performed.

In a first step 210 of the method according to the present invention, information 117 related to at least one functionality of the vehicle 100 is received. The functionality related information is send from the at least one vehicle external communication unit 161 and is received by usage of the at least one internal communication unit 116. The first step 210 may e.g. be performed by use of a below described reception unit/means 141.

In a second step 220 of the method according to the present invention, at least one functionality defined in the add-on interface 140 is updated, based on the received information related to at least one functionality of the vehicle 100. As mentioned above, the add-on interface 140 is arranged in the vehicle 100 as an interface between the at least one vehicle internal system 120 and the at least one add-on system 130. The second step may e.g. be performed by use of a below described updating unit/means 142.

By usage of the present invention, the functionality of the add-on interface may, based on information provided e.g. by a final user and/or a customer, easily, remotely, and at low cost, be adapted such that it matches essentially any possible add-on system that is implemented in the vehicle.

The at least one functionality defined in the add-on interface may, according to various embodiments of the present invention be updated such that an update of at least one functionality related to the at least one vehicle internal system is achieved and/or such that an update of at least one functionality related to the at least one add-on system is achieved. It is hereby possible to match the add-on interface to all of these systems, such that they may interact and smoothly work together.

Generally, the information related to at least one functionality may be received from, i.e. may be provided/inputted essentially anyone, e.g. by usage of an add-on interface configuration tool 414. For example, the functionality related information, may be provided by a final user of the vehicle 100, or by at least one other part than the manufacturer, such as e.g. a customer, wherein the at least one other part may have provided, manufactured, installed and/or adapted the at least one add-on system 130. Of course, the functionality related information may also be provided by the manufacturer of the vehicle. Hereby, a very flexible add-on interface is provided.

According to embodiments of the present invention, the update of the add-on interface functionality is parameter-based. More in detail, the information related to the at least one functionality, which is received 210 as transmitted/sent e.g. from a final user and/or a customer via the external 161 and internal 116 communication units, includes one or more vehicle related parameters for the at least one functionality defined in the add-on interface. The functionality of the add-on interface is then updated 221 based on the one or more vehicle related parameters.

Thus, said information related to said at least one functionality may include one or more vehicle related parameters, and said updating 220 of said at least one functionality may be parameter-based and may include utilizing 221 said one or more vehicle related parameters for said at least one functionality defined in said add-on interface, whereby the functionality of the add-on interface is adaptable or adjustable by usage of parameter adaption or adjustment without a compilation of programming code and without an update of the programming code.

By usage of the present invention, for example the final user and/or a customer, which may have better knowledge of the added add-on systems, can adapt the functionality of the add-on interface by simply transmitting/inputting parameter related information. The adaption/adjustment/configuration of the add-on interface functionality may completely be controlled by another part than the manufacturer, such as a final user and/or a customer, that normally have better knowledge about some of the add-on systems than the original manufacturer has. In other words, the updating/configuring of the add-on interface 140 may be performed without involvement of the manufacturer of the vehicle 100, which is very flexible for the final user and/or customer.

The one or more vehicle related parameters may, according to an embodiment, relate to the vehicle 100 itself, e.g. to a maximal load for said vehicle, to at least one position for the vehicle, to at least one sound level at the vehicle and/or to at least one temperature of the vehicle 100.

The one or more vehicle related parameters may also relate to a road section travelled by the vehicle 100, e.g. to at least one speed limit for the road section.

The one or more vehicle related parameters may also relate to ambient conditions surrounding the vehicle 100, e.g. to at least one weather condition, at least one point in time, and/or at least one temperature related to the vehicle.

Thus, the functionality of the add-on interface may easily and flexibly be adapted/adjusted to match essentially any parameter and/or condition related to the vehicle. The parameter based update/adjustment of the add-on interface may, as mentioned above, be performed without involvement of the manufacturer, which reduces the costs for the final user and/or customer.

According to an embodiment of the present invention, the received information related to the at least one functionality includes information related to the add-on interface 140 itself. Thus, information specifically related to the add-on interface is then received by the internal communication unit 116 from the external communication unit 161. Then, the update/adjustment 220 of the at least one add-on interface functionality includes altering 222 the add-on interface itself, i.e. updating the add-on interface software.

The information specifically being related to the add-on interface 140 itself may then include software update information for the add-on interface 140, which is used for at least partly updating at least a part of a programming code defining the add-on interface 140. In other words, a software/firmware update of the add-on interface program, i.e. the add-on interface programming code, is according to this embodiment performed, such that a fast, easy and remote adaption of the add-on interface functionality is achieved.

Figure 3:
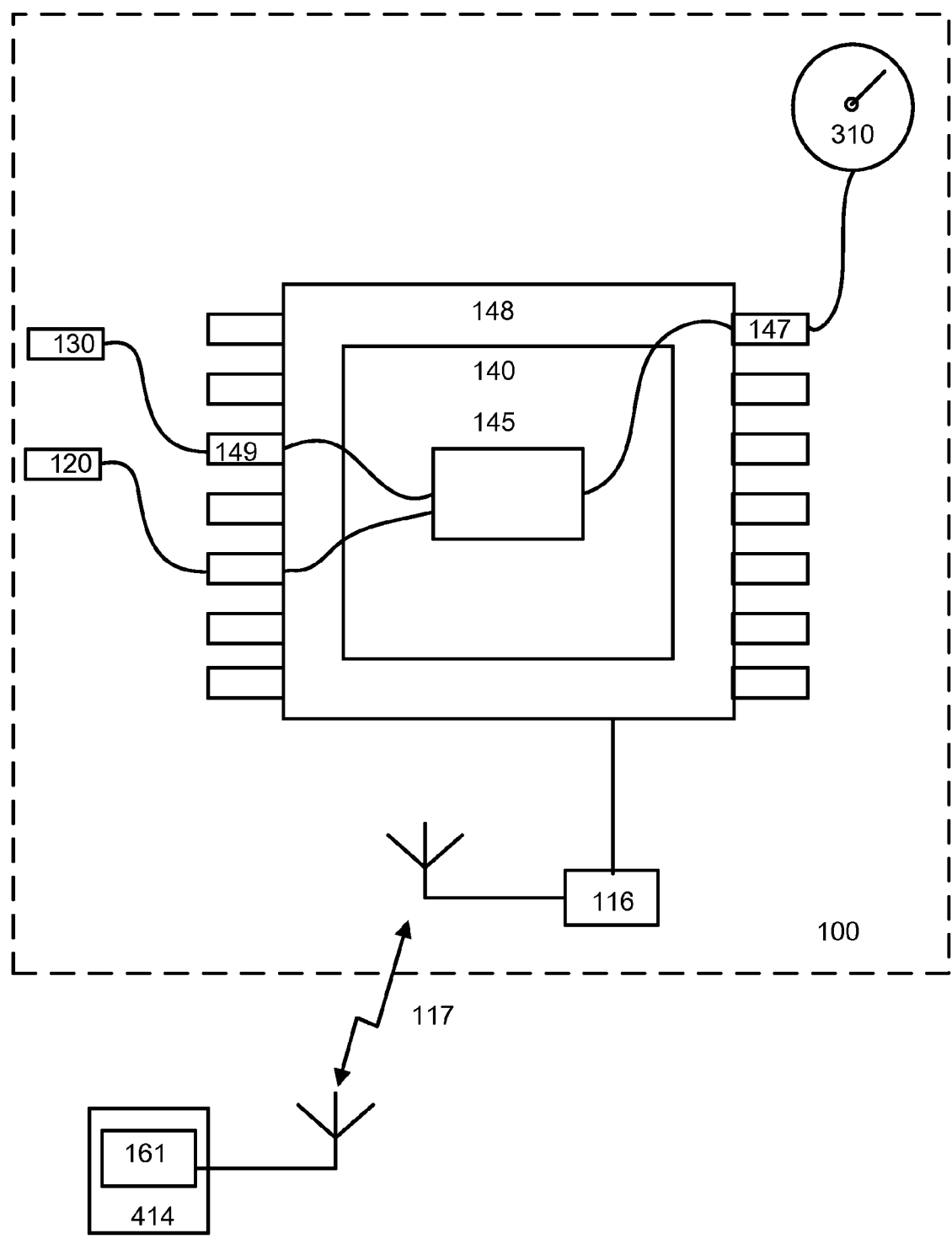

FIG. 3 schematically illustrates a non-limiting example of an embodiment of the present invention. The functionality of the add-on interface 140 may, as mentioned above, be adapted based on functionality related information provided e.g. by a final user and/or a customer, by usage of an add-on interface configuration tool 414, which is associated with at least one external communication unit 161. The at least one external communication unit 161 transfers the functionality information from the add-on interface configuration tool 414 to the add-on interface 140 via the at least one internal communication unit 116. The add-on interface tool 414 may here be configured to receive information provided by the add-on interface, which in its turn may be based on information/signals from one or more vehicle internal systems 120 and/or one or more add-on systems 130. An off-board service arranged in the add-on interface configuration tool 414 may then react on the received information by feed-backing, i.e. sending functionality update information to the add-on interface 140, which is then updated as described herein. Such updates may, when the present invention is used, be made during runtime of the vehicle, i.e. without any vehicle off road time spent.

The add-on interface 140 functionality may be adapted/adjusted/configured by usage of parameter adaption/adjustment/configuration, which does not demand a compilation of programming code and/or update of the actual programming code. Alternatively, the add-on interface 140 functionality may be adapted/adjusted/configured by use of software/firmware update. The final user and/or customer may thus remotely redefine/update the functionality of the add-on interface by usage of the herein described embodiments.

In FIG. 3, a non-limiting example of a functionality 145 including logical operation performed on a signal from an add-on system 130, and on a signal from a vehicle internal system 120 is illustrated. Also, a signal produced in/by the add-on interface itself may be used as an input for the function block 145. An output signal is provided to an output, such as an output pin 147, of the add-on interface 140, and is available for essentially usage in the vehicle, e.g. for being displayed in an instrument 310 of an internal 120 and/or add-on 130 system. The signal from the add-on system 130 may be input on an external control system network input 149, e.g. an external CAN input. The signal from the vehicle internal system 120 may be input on essentially any suitable input of the add-in interface 140.

Thus, the final user and/or customer may remotely easily adapt/adjust/configure the add-on interface 140 to match the at least one add-on system being implemented in the vehicle, such that the functionalities provided by the vehicle may involve the add-on systems 130.

Figure 4:
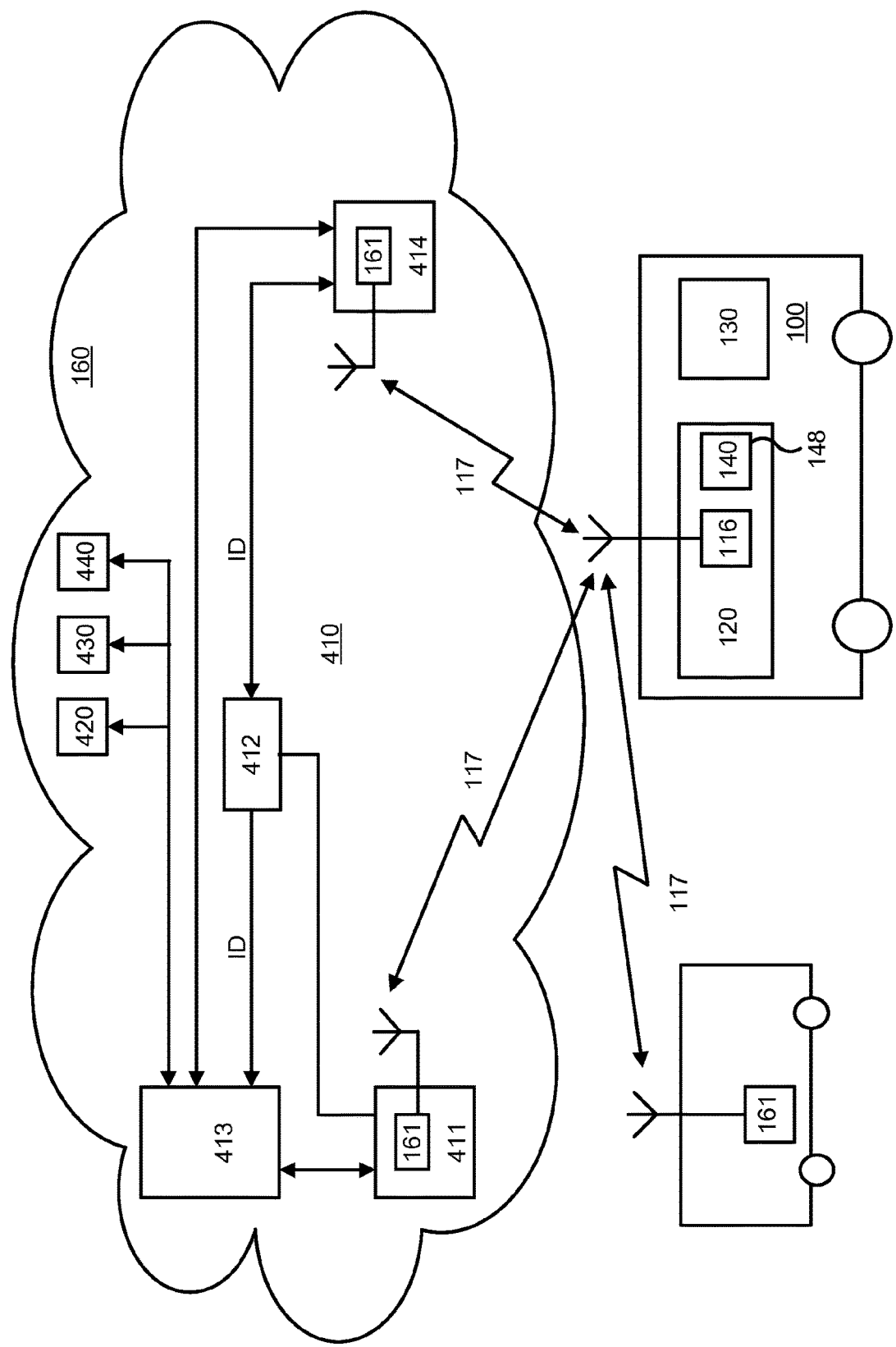

FIG. 4 schematically illustrates a system facilitating a general platform for handling vehicles including one or more add-on systems 130. As is understood by a skilled person, FIG. 4 for pedagogical reasons only shows some of the units/devices/entities/nodes in such a system. Essentially, only the units/devices/entities/nodes useful for explaining the concept are schematically illustrated in FIG. 4.

A vehicle 100, as the one described in this document, includes one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located essentially anywhere outside of the vehicle, e.g. in another vehicle and/or in one or more nodes 411, 412, 413, 414, 420, 430, 440 of an add-on/bodybuilder network 410. The one or more nodes 411, 412, 413, 414, 420, 430, 440 of the add-on/bodybuilder network 410 may be located e.g. in a web/internet/cloud related unit, in an infrastructure unit, in a server and/or in a database, as mentioned above. Generally, the add-on/bodybuilder network 410 may be implemented as an internet cloud 160 related solution. Generally, the one or more nodes 411, 412, 413, 414, 420, 430, 440 of an add-on/bodybuilder network 410 are in FIG. 4 for pedagogic reasons illustrated as separate nodes. However, these nodes may be implemented less nodes than illustrated in FIG. 4.

The add-on interface 140 utilized for the embodiments of the present invention may be an advanced and flexible interface provided with advanced logical functionality and possibilities for flexible definition of interface inputs and/or outputs. According to an embodiment, the logical functionality providable by the add-on interface 140 includes essentially any useful logical, numerical and/or mathematical operations, that may be operated on one or more signals input to the add-on interface 140. The input signals may here, according to various embodiments, include essentially any kind of signal, such as digital and/or analog signals, comprising well defined signal value levels and/or numerical signal values. Thus, the add-on interface 140 used by the embodiments of the present invention may be considerably more advanced than conventional add-on interfaces are, including e.g. processing of numerical signals, representation of physical values as numerical values, and/or performing numerical operations on the numerical values/signals.

The add-on interface 140 may also easily be configured such that it is able to interpret the signals/information being input to it from the one or more add-on systems 130, e.g. via an external control system network input, such as an external controller area network (CAN) input, of the interface/control unit 148 including the add-on interface 140. The add-on interface 140 may also easily be configured to output signals/information to the one or more add-on systems 130, via the external controller area network (CAN), such that the signals/information may be interpreted/used by the add-on systems 130. The add-on interface 140 may be arranged for converting signaling/information formats being used by the one or more add-on systems 130 to signaling/information formats being used by the one or more vehicle internal systems 120, and vice versa. Hereby, the one or more add-on systems 130 may communicate with the one or more vehicle internal systems 120, and possibly also with other systems, such as systems related to, or being included in the add-on/bodybuilder network 410.

Further, the add-on interface 140 may also be easily configured for interpreting sensor signals being provided by the one or more add-on systems 130, such that a flexibility regarding addition of sensors is achieved for the vehicle. Essentially, any type of sensor, providing any type of sensor signal having essentially any feature, e.g. indicating any type of physical quantity unit may be implemented in the one or more add-on systems 130, whereby the add-on interface 140 is configured to process the provided sensor signal accordingly. The add-on interface 140 may also be easily configured to output a processed sensor signal having suitable features to the one or more add-on 130 and/or vehicle internal systems 120, such as e.g. to the instrument cluster 310 of the driving compartment, and possibly also to other systems, such as systems/nodes related to, or being included in the add-on/bodybuilder network 410. The add-on interface 140 may for example be configured for outputting sensor signals adapted for being displayed in any suitable vehicle instrument.

The add-on network 410 may include an add-on interface configuration tool 414, which may include an external communication unit 161 arranged for communicating with the at least one internal communication unit 116 included in the vehicle. By use of the add-on interface configuration tool 414, the add-on interface 140 may easily be configured and/or defined, as is described in this document. Information related to how the add-on interface 140 is to be configured/defined may be provided based on input to a manufacturer interface entity 420 and/or a client/user interface entity 430 by a manufacturer and/or a client/user. One or more of the manufacturer interface entity 420 and the client/user interface entity 430 may be implemented as an application (APP) program, as an interface portal, as an interface program, or as any suitable equipment arranged for presenting information and/or for receiving input of information.

An add-on/bodybuilder network 410 may be arranged, e.g. in an internet cloud 160 configuration, for communication and/or configuration of the one or more add-on systems 130, and/or for communication with the manufacturer interface entity 420 and/or the client/user interface entity 430. The add-on network 410 may include a communication node 411, which may include an external communication unit 161 arranged for communicating with the at least one internal communication unit 116 included in the vehicle.

Information transmitted to and/or from the vehicle 100 may have one or more features related to one or more configured functions of the add-on interface 140 and/or related to a configured signaling format used for the connection between the at least one internal communication unit 116 and the at least one external communication unit 161. According to some embodiments, an immutable and unique identifier ID may be created based on, and assigned to, the specific configuration of the add-on interface functions and/or of the used signaling.

Generally, the add-on interface configuration tool 414, the manufacturer interface entity 420 and/or the client/user interface entity 430 is normally unaware of the features of the one or more add-on systems 130 and/or of the configuration of the add-on interface 140. Therefore, the add-on interface configuration tool 414, the manufacturer interface entity 420 and/or the client/user interface entity 430 are often also unaware of how to interpret information provided by the one or more add-on systems 130 to them. The immutable and unique identifier ID may therefore be added, e.g. as included in a packet header, to information sent from the one or more add-on systems 130. The information may then be decoded, in a codec 413 connected to the communication node 411, by usage of this immutable and unique identifier ID. The immutable and unique identifier ID may, after having been previously provided by the add-on interface 140 and/or by the add-on interface configuration tool 414, be stored in a register 412 of the add-on network 410. The codec 413 is arranged for encoding and/or decoding information transmitted from and/or to the vehicle 100, e.g. by usage of the immutable and unique identifier ID, which is then provided to the codec 413 by the register 412.

Thus, the codec 413 may detect the immutable and unique identifier ID in a packet header of information transmitted from the vehicle 100, and may therefore be able to determine the specific configuration of the add-on interface 140 and how to detect the information in the packets. Correspondingly, the immutable and unique identifier ID may also be added, e.g. in a packet header, to information transmitted to the vehicle 100. The add-on interface 140 may then, based on the immutable and unique identifier ID, easily identify to which one or more add-on systems 130 and/or one or more vehicle internal systems 120 the information is intended to be transferred.

One or more diagnosis equipment 440 may be arranged in the add-on network 410 to process diagnosis related information. Such one or more diagnosis equipment may for example be included in the manufacturer interface entity 420 and/or in the client/user interface entity 430, or may be implemented in a separate diagnosis equipment 440. The one or more diagnosis equipment 440 is normally unaware of the features of the possibly unknown one or more add-on systems 130 and/or of the configuration of the add-on interface 140. Therefore, in order to provide a generic diagnosis system, diagnostic identifiers are created based on, and assigned to, the specific configuration of the add-on interface 140 and/or the one or more add-on systems 130. Hereby, the diagnosis equipment 440 may be able to provide a reliable diagnosis also for all add-on systems 130, also for the ones being unknown for the diagnosis equipment.

The person skilled in the art will appreciate that a method for updating at least one functionality of a vehicle according to the present invention may also be implemented in a computer program, which, when it is executed in a computer, instructs the computer to execute the method. The computer may be included in the herein described system and/or may be coupled/connected to the herein described system. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 5:
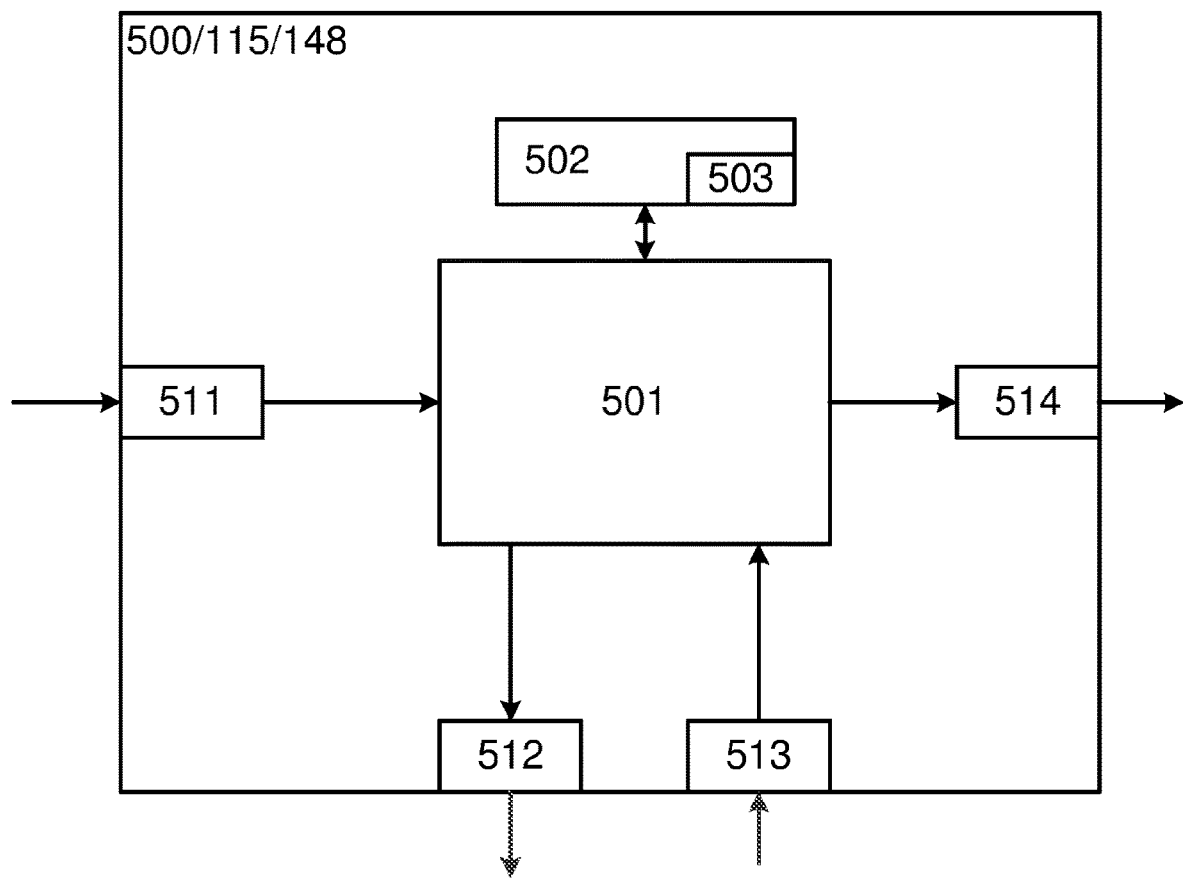
FIG. 5 is a schematic illustration of a control unit according to some embodiments of the present invention.

FIG. 5 shows in schematic representation a control unit/system/means 500/115/148. As mentioned above, the vehicle 100 may include one or more control units 115. Also, the add-on interface 140 may be implemented as a control unit 148. The control unit/system/means 500/115/148 comprises a computing unit 501, which may be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit/system/means 500/115/148, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit/system/means 500/115/148 is provided with devices 511, 512, 513, 514 for receiving and transmitting input and output signals. These input and output signals may comprise waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems within or outside the vehicle 100.

Each of the connections to the devices for receiving and transmitting input and output signals can be comprise one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 501 and that the above-stated memory may be constituted by the memory unit 502.

Control systems in modern vehicles commonly comprise communication bus systems including one or more communication buses for linking a number of electronic control units (ECU's), or controllers, and various components located on the vehicle. Such a control system may comprise a large number of control units/means and the responsibility for a specific function can be divided amongst more than one control unit/means. Vehicles of the shown type thus often comprise significantly more control units/means than are shown in FIGS. 1, 3, 4 and 5, which is well known to the person skilled in the art within this technical field.

In the shown embodiment, the present invention is implemented in the control unit/system/means 500/115/148. The invention can also, however, be implemented wholly or partially in one or more other control units/systems/means already present in the vehicle, or in some control unit/system/means dedicated to the present invention.

According to an aspect of the invention, a control unit 148 arranged for updating at least one functionality of a vehicle 100 is provided. The vehicle 100 includes, as mentioned above:

- at least one vehicle internal system 120;
- at least one add-on system 130, the add-on system being arranged in the vehicle 100 after production of the vehicle by a manufacturer; and
- at least one internal communication unit 116 arranged for communication with at least one vehicle external communication unit 161.

The control unit 148 includes a reception unit/means 141, arranged for receiving 210, by usage of the at least one internal communication unit 116, information 117 related to at least one functionality of the vehicle 100 from the at least one vehicle external communication unit 161, as explained above.

The control system further includes an updating unit/means 142, arranged for updating 220, based on the information related to at least one functionality of the vehicle 100, at least one functionality defined in an add-on interface 140, as explained above. The add-on interface 140 is arranged in the vehicle 100 as an interface between the at least one vehicle internal system 120 and the at least one add-on system 130, as described herein.

By activation of the above described reception unit/means 141, and updating unit/means 142, at least one functionality of a vehicle is updated, which has the above-mentioned advantages.

Here and in this document, units/means are often described as being arranged for performing steps of the method according to the invention. This also includes that the units/means are designed to and/or configured to perform these method steps.

The at least one control unit/system/means 148 is in FIG. 1 illustrated as including separately illustrated units/means 141, 142. Also, the control system/means 148 may include or be coupled to e.g. other device/means 115. These means/units/devices 141, 142, 148, 115 may, however, be at least to some extent logically separated but implemented in the same physical unit/device. These means/units/devices 141, 142, 148, 115 may also be part of a single logic unit which is implemented in at least two different physical units/devices. These means/units/devices 141, 142, 148, 115 may also be at least to some extent logically separated and implemented in at least two different physical means/units/devices. Further, these means/units/devices 141, 142, 148, 115 may be both logically and physically arranged together, i.e. be part of a single logic unit which is implemented in a single physical means/unit/device. These means/units/devices 141, 142, 148, 115 may for example correspond to groups of instructions, which can be in the form of programming code, that are input into, and are utilized by at least one processor when the units/means are active and/or are utilized for performing its method step, respectively. It should be noted that the control system/means 148 may be implemented at least partly within the vehicle 100 and/or at least partly outside of the vehicle 100, e.g. in a server, computer, processor or the like located separately from the vehicle 100.

As mentioned above, the units/means 141, 142 described above may correspond units/means included in the claimed control unit 148 arranged for performing the embodiments of the present invention, and the present invention as such.

The control system according to the present invention can be arranged for performing all of the above, in the claims, and in the herein described embodiments method steps. The system is hereby provided with the above described advantages for each respective embodiment.

A skilled person also realizes that the above described system may be modified according to the different embodiments of the method of the present invention. The present invention is also related to a vehicle 100, such as a truck, a bus or a car, including the herein described control unit 148 arranged for updating at least one functionality of a vehicle.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the above described embodiments. Instead, the present invention relates to, and encompasses all different embodiments being included within the scope of the independent claims.

The invention claimed is:

1. A method for updating at least one functionality of a vehicle, said vehicle comprising: at least one vehicle internal system; at least one add-on system, said add-on system being arranged in said vehicle after said vehicle is produced by a manufacturer; and at least one internal communication unit configured for communication with at least one vehicle external communication unit, wherein the method comprises:

receiving, by usage of said at least one internal communication unit, information related to at least one functionality of said vehicle from said at least one vehicle external communication unit; and updating, based on said information related to at least one functionality of said vehicle, at least one functionality defined in an add-on interface, said add-on interface being arranged in said vehicle as an interface between said at least one vehicle internal system and said at least one add-on system, wherein said information related to said at least one functionality comprises one or more vehicle related parameters; and said updating of said at least one functionality is parameter-based and comprises utilizing said one or more vehicle related parameters for said at least one functionality defined in said add-on interface, whereby the functionality of the add-on interface is adaptable or adjustable by usage of parameter adaption or adjustment without a compilation of programming code and without an update of the programming code.

2. The method as claimed in claim 1, wherein said one or more vehicle related parameters are related to one or more of:

said vehicle itself;

a road section travelled by said vehicle; and/or ambient conditions surrounding said vehicle.

3. The method as claimed in claim 1, wherein said information related to said at least one functionality comprises information related to said add-on interface itself; and whereby said updating of said at least one functionality comprises altering said add-on interface.

4. The method as claimed in claim 3, wherein information related to said add-on interface itself comprises software update information for said add-on interface;

and whereby said updating of said at least one functionality comprises an update of at least a part of a programming code defining said add-on interface.

5. The method as claimed in claim 1, wherein said updating of said at least one functionality defined in said add-on interface comprises one or more of:
an update of at least one functionality related to said at least one vehicle internal system;
and/or an update of at least one functionality related to said at least one add-on system.

6. The method as claimed in claim 1, wherein said at least one vehicle external communication unit is comprised in and/or is associated with one or more of:
at least one web and/or internet related unit;
at least one internet cloud related unit (411, 414, 420, 430, 440);
at least one infrastructure unit (411, 414, 420, 430, 440);
at least one external communication unit comprised in at least one other vehicle;
at least one server;
at least one database;
at least one processor; and/or at least one computer.

7. The method as claimed in claim 1, wherein said at least one internal communication unit is comprised in a control system network of said vehicle.

8. The method as claimed in claim 7, wherein said at least one add-on system is connected to an external control system network input of an interface control unit comprising said add-on interface.

9. The method as claimed in claim 1, wherein said at least one internal communication unit is configured for communicating with said at least one vehicle external communication unit by usage of one or more of:
a wireless communication standard connection; and/or
a wired connection.

10. The method as claimed in claim 1, wherein said at least one add-on system is a system provided by at least one other part than said manufacturer of said vehicle.

11. The method as claimed in claim 1, wherein said information related to at least functionality of said vehicle is received from one or more of: a final user of said vehicle;
at least one other part than said manufacturer, said at least one other part having knowledge of said at least one add-on system; and/or
said manufacturer.

12. A computer program product comprising computer program code stored on a non-transitory computer-readable medium, said computer program product used for updating at least one functionality of a vehicle, said vehicle comprising: at least one vehicle internal system; at least one add-on system, said add-on system being arranged in said vehicle after said vehicle is produced by a manufacturer; and at least one internal communication unit arranged for communication with at least one vehicle external communication unit, said computer program code comprising computer instructions to cause one or more control units to perform the following operations:

receiving, using said at least one internal communication unit, information related to at least one functionality of said vehicle from said at least one vehicle external communication unit; and
updating, based on said information related to at least one functionality of said vehicle, at least one functionality defined in an add-on interface, said add-on interface being arranged in said vehicle as an interface between said at least one vehicle internal system and said at least one add-on system, wherein:
said information related to said at least one functionality comprises one or more vehicle related parameters; and
said updating of said at least one functionality is parameter-based and comprises utilizing said one or more vehicle related parameters for said at least one functionality defined in said add-on interface, whereby the functionality of the add-on interface is adaptable or adjustable using parameter adaption or adjustment without a compilation of programming code and without an update of the programming code.

13. A control unit configured for updating at least one functionality of a vehicle, said vehicle comprising: at least one vehicle internal system; at least one add-on system, said add-on system being arranged in said vehicle after said vehicle is produced by a manufacturer; and at least one internal communication unit configured for communication with at least one vehicle external communication unit, wherein said control unit 148 being configured for:
receiving, by usage of said at least one internal communication unit, information related to at least one functionality of said vehicle from said at least one vehicle external communication unit; and
updating, based on said information related to at least one functionality of said vehicle, at least one functionality defined in an add-on interface, said add-on interface being arranged in said vehicle as an interface between said at least one vehicle internal system and said at least one add-on system; wherein
said information related to said at least one functionality comprises one or more vehicle related parameters; and
said updating of said at least one functionality is parameter-based and comprises utilizing said one or more vehicle related parameters for said at least one functionality defined in said add-on interface, whereby the functionality of the add-on interface is adaptable or adjustable by usage of parameter adaption or adjustment without a compilation of programming code and without an update of the programming code.

14. The method as claimed in claim 1, wherein said at least one vehicle internal system comprises at least one of an engine, a clutch, or a gearbox.

15. The method as claimed in claim 1, wherein said at least one add-on system is a piece of bodywork provided by a body-builder.

* * * * *